United States Patent [19]

Vance

[11] Patent Number: 4,649,524

[45] Date of Patent: Mar. 10, 1987

[54] INTEGRATED ACOUSTIC NETWORK

[75] Inventor: James B. Vance, Saskatoon, Canada

[73] Assignee: Potash Corporation of Saskatchewan Mining Limited, Saskatchewan, Canada

[21] Appl. No.: 525,534

[22] Filed: Aug. 22, 1983

[30] Foreign Application Priority Data

Jul. 5, 1983 [CA] Canada ................................. 431842

[51] Int. Cl.$^4$ .............................................. G01V 1/00
[52] U.S. Cl. ....................................... 367/13; 367/191;
181/101; 181/122; 340/690
[58] Field of Search ....................... 299/1, 12; 181/101,
181/122; 340/870.09, 690; 73/587, 594, 784,
801; 367/13, 36, 37, 56, 58, 62, 47, 49, 135, 136,
191

[56] References Cited

U.S. PATENT DOCUMENTS

| | | | |
|---|---|---|---|
| 3,506,957 | 4/1970 | Davison | 340/690 |
| 3,585,581 | 6/1971 | Aune et al. | 367/136 |
| 3,949,353 | 4/1976 | Waters et al. | 340/690 |
| 4,033,179 | 7/1977 | Romrell | 73/594 |
| 4,066,992 | 1/1978 | Buller et al. | 340/690 |
| 4,107,981 | 7/1978 | Kanagawa et al. | 73/784 |
| 4,198,621 | 4/1980 | Roper | 340/870.24 |
| 4,300,135 | 11/1981 | Korn et al. | 181/122 |
| 4,320,471 | 3/1982 | Rietsch | 367/49 |

FOREIGN PATENT DOCUMENTS

| | | | |
|---|---|---|---|
| 761606 | 6/1967 | Canada | 340/8 |
| 900581 | 5/1972 | Canada | 340/11 |
| 968056 | 5/1975 | Canada | 349/10 |

OTHER PUBLICATIONS

Fisher, Jr., "Microseismic Roof Fall Warning System Development", Technical Report, Bureau of Mines, Integrated Sciences, Inc.; May 30, 1980, pp. 1–194.

*Primary Examiner*—Thomas H. Tarcza
*Assistant Examiner*—Ian J. Lobo
*Attorney, Agent, or Firm*—Browdy and Neimark

[57] ABSTRACT

This invention relates to an integrated acoustic network system to provide warning of impending groundfall in underground mines. The system includes a plurality of geophones which derive acoustic signals by which the source of seismic disturbances is located, and an array of high frequency piezoelectric sensors which pick up signals from small ground disturbances which precede groundfall. A warning system is provided both at the scene of mining operations and at a central location of impending groundfall and of the location of its occurrence.

15 Claims, 7 Drawing Figures

INTEGRATED ACOUSTIC NETWORK

FIELD OF INVENTION

This invention relates to an integrated acoustic network for monitoring subterranean ground disturbances and more particularly, though not exclusively, to such a network of improved reliability to provide warning of impending groundfall in an underground mine.

It is already known to provide an arrangement of geophones for surveillance of ground activity in underground mines. With these systems it is possible by triangulation techniques to locate the position of the source of seismic signals caused by ground disturbance. The state of the art is such that it is possible to install a system including geophones and a computer to provide on-line analysis of the location of microseismic events.

An example of a prior art system used to locate and record seismic activity around an underground mine is found in U.S. Pat. No. 3,949,353 issued Apr. 6, 1976 to Kenneth H. Waters and James C. Fowler.

There is also U.S. Pat. No. 4,066,992 issued Jan. 3, 1978 to Paul L. Buller, William L. Chapman, Bobby J. Thomas and James C. Fowler for a seismic monitoring system. A plurality of geophones are employed to sense seismic events, i.e., ground failure, and a computer is used to locate and record the events.

It is clearly of vital importance that a monitoring system for ground activity in the vicinity of an underground mine provide an advanced warning to personnel working underground of the possibility of an impending ground failure. To this end systems such as those described in U.S. Pat. Nos. 3,949,353 and 4,066,992 are of very limited value.

During ground failure seismic vibrations are emitted in a broad spectrum of frequencies from less than 1 Hertz to over 100 Kilohertz. Due to the properties of geophones and the seismic transmission properties of rocks, it is normally possible with this type of sensor to pick up vibrations only from a narrow part of this spectrum of emissions. Geophones are usually sensitive to signals below 1 Kilohertz. The more common type of such sensors, as used in petroleum exploration, are sensitive to high amplitude signals of low frequency which are easily transmitted by most rock types.

More recently a technique has been developed using high frequency microseismic emissions to anticipate falls of ground. This technique is sensitive to rock noise emitted on a scale of grain boundary sized strains. The sensing crystal is a transducer type which has been designed to be extremely sensitive to high frequency (10 Kilohertz to 200 Kilohertz) microseismic emissions. Noise counts recorded by this method typically range from 1,000 to 100,000 emissions per minute. The equipment used in the warning system also records an estimate of the amount of energy being released from the rock behaviour. Current equipment design includes:

1. An accumulator to count the number of seismic events;
2. An accumulator estimating the amount of energy;
3. Microprocessor circuits to take the previous counts of noise events and energy each minute and calculate a ratio of the two.

It has been found that neither of the counts (events or energy) is sufficient to provide accurate warning of impending failure. However, it was found that by calculating the ratio of energy/event count, a very distinct anomaly occurred prior to groundfalls. It has been found that the energy/event ratio is a quite reliable indicator of impending groundfall.

High frequency emissions are far more influenced by attenuation than low frequency emissions and represent microseismic signals originating due to strain near the receiving sensor. They are signals of relatively low amplitude, and can represent microseismic changes which precede a fall of ground. However, the disadvantage of high frequency signals is that they cannot be easily correlated between sensors, and hence are not useful to indicate location of ground disturbance.

The system described in U.S. Pat. No. 4,066,992 is responsive only to low frequency signals, i.e., signals which come simultaneously with or after a ground failure. Geophones are employed which respond to low frequencies only. Also, the system is inflexible in that the geophones are permanently installed at widely separated positions, and do not appear to take any account of extension of the mining operations. There is also no provision for alarm signals at the site of operations where underground workers are located.

U.S. Pat. No. 3,949,353 also describes a system which utilizes low frequency seismic analysis to locate and record seismic acitivity. It distinguishes failure in an earth formation, but it does not detect precursor signals which precede such failure. Nor does it provide warning signals to be given directly to underground workers.

SUMMARY OF INVENTION

The present invention provides an integrated acoustic network system to provide improved monitoring of the earth formations in the vicinity of an underground mine. To this end there is employed an array of high frequency sensors in the form of piezoelectric transducers which detect microseismic vibrations in the frequency range from 10 to 200 Kilohertz. The transducers are mounted at appropriate locations within the mine in contact with the rock formation. They may be moved to new locations as excavation in the mine proceeds.

Also included in the integrated acoustic network of the invention is an array of at least four geophones located at predetermined points in the mine. The geophones respond to large scale strains in the rock formations and the low frequency response of the geophones occurs at the time of or after ground movement. Hence it is historical information. The usefulness of the low frequency source locations for predicting groundfalls involves recording rock movements located from geophone signals and recognizing patterns of the movements which develop in a period of days or weeks before ground failure. These features vary from mine to mine; in potash mines they may be related to tension cracking whereas in "hard rock" mines they may be rockbursts.

Thus, determination of the expected failure location from geophone locations involves programming for each mine based on knowledge at that mine of the behaviour pattern of rocks in the period before failure.

The integrated acoustic network system of the present invention, by incorporating both low frequency sensors (geophones) for location prediction and high frequency sensors for time prediction, provides a degree of safety not heretofore available.

The resulting signals from both low and high frequency arrays are fed to signal processing apparatus, and thence to data processing apparatus which extracts information from the signals with respect to impending groundfalls and also on the location of seismic events preceding such groundfalls. The data processing equipment controls a warning system which provides data to underground workers at the mine site as well as to a central location.

Accordingly, it is an object of the invention to provide a continuous monitor for an underground mine which provides reliable information on impending groundfall and the expected location of such groundfall.

It is another object of the invention to provide a monitor system for underground mines which includes an alarm system to alert personnel working in the mine when there is a danger of an impending groundfall.

It is a further object of the invention to provide an integrated acoustic network system for continuous surveillance of underground mines including sensors which can readily be moved to new locations as mining operations proceed.

In accordance with the invention, there is contemplated an integrated acoustic network system for providing a warning of impending groundfall in a mine comprising an array of high frequency microseismic sensor means situated at spaced locations in said mine to receive high frequency microseismic signals related to stress build up in ground formations adjacent to the said mine; an array of at least four low frequency seismic sensor means situated at spaced locations in said mine to receive low frequency seismic signals related to movement in ground formations adjacent to the said mine; data processing means; means for transmitting said high and low frequency signals from said arrays to said data processing means; said data processing means processing signals from said high and low freqnency arrays to recognize and determine the location of an impending ground failure; and a warning system connected to said data processing means to receive signals of an impending ground failure therefrom.

BRIEF DESCRIPTION OF THE DRAWINGS

Other objects, advantages and features of the invention will become apparent from the following description of an exemplary embodiment thereof taken in conjunction with the accompanying drawings in which.

DESCRIPTION OF THE PREFERRED EMBODIMENT

Figure 1:
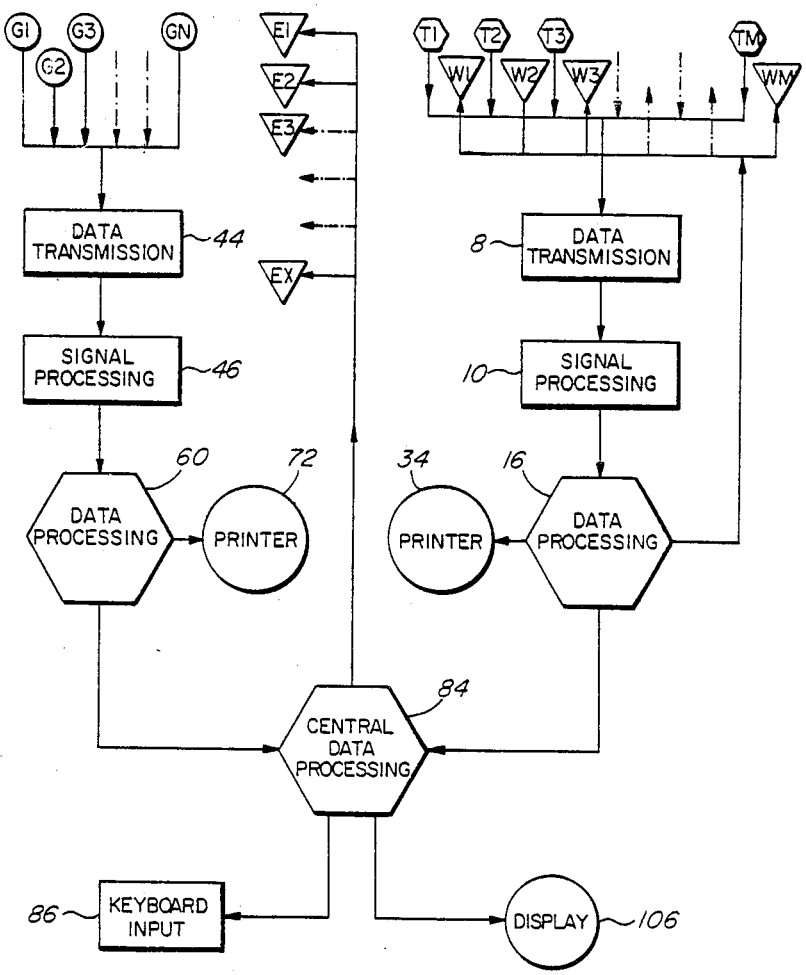
FIG. 1 is a block diagram of the overall system of the integrated acoustic network.

The overall system as illustrated in FIG. 1 includes as a very important feature a high frequency array of piezoelectric transducers T1 to TM which are located at appropriate locations in the mine and in intimate contact with the rock formations so as to respond to microseismic signals. The output signals from the transducers are applied to data transmission 8 which includes any preamplifiers and signal conditioning for the purposes of data transmission. The transmission may be any suitable means such as electrical, radio wave or optical.

Signal processing 10 includes any signal counting, screening, recognition or timing that may be done external to the data processing function.

Data processing 16 includes for high frequency monitoring all screening required to calculate energy/event ratios and recognition of energy/event anomalies. It also controls the warning devices W1 to WM, one of which is associated with each of the transducers in order to provide a warning to workers at the mine site. This is in contradistinction to mine surveillance systems of the prior art which provide warning systems only at a central location. Also, most importantly, this high frequency seismic array acts upon microseismic vibrations which precede groundfall.

Printer 34 is connected to the data processing 16 to provide a continuous record of signals which have occurred. Data processing 16 also has an output connected to the central data processing 84.

As previously indicated, the high frequency system is not suitable for determining the locations of the the source of ground failure. In order to determine the expected location of the failure a low frequency array of geophones shown as G1 to GN is employed. At least four geophones are employed which are located at spaced positions within the mine. The determination of the locations of seismic signals is performed by triangulation as will be explained more fully hereinafter.

Data transmission 44 is employed to transfer the low frequency signals from the geophones to signal processing 46 and thence to data processing 60 the output of which is also connected to the central data processing 84. As in the case of the high frequency signals a printer 72 is employed to make a record of the low frequency events received. These printers may be installed near the underground mining location in order to provide information near to the location of underground personnel.

The central data processing 84 includes all logic and control to recognize and correlate both high frequency and low frequency seismic activity, integrate the information into a scenario of expected ground behaviour, and control central warning devices E1 to EX.

The keyboard input 86 connected to central data processing 84 allows user access to the system to specify input variables and to call out desired documentation of microseismic and system behaviour.

Display 106, which receives its input from central data processing 84, may be any combination of audiovisual feedback to mine personnel, and to other personnel located at the central data processing point.

Figure 2:
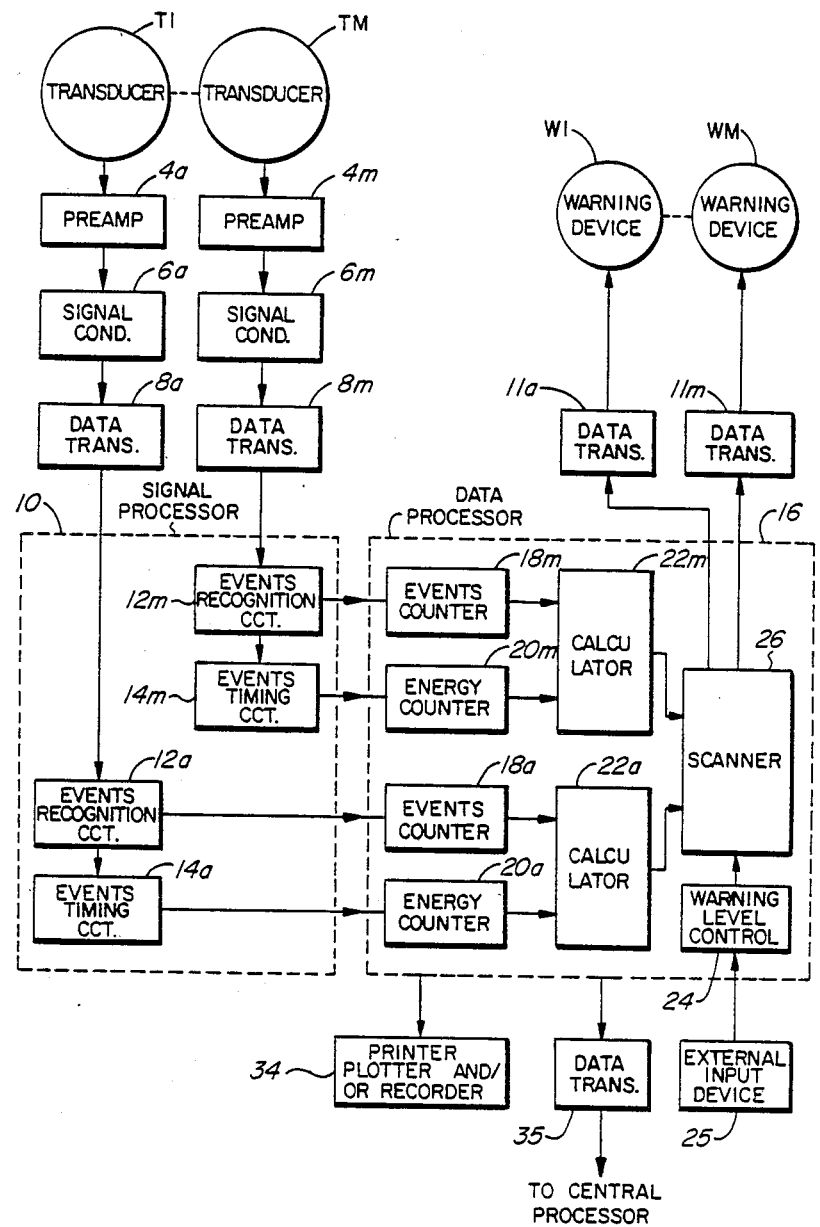
FIG. 2 is a block diagram of the high frequency subsystem.

FIG. 2 shows in more detail the various elements of the high frequency subsystem. The pressure sensitive transducers T1 to TM, only two of which are shown in FIG. 2, respond to high frequency microseismic signals which may be a result of stress, the transducers consisting of lithium sulphate or some similar piezoelectric material. They are mounted in physical contact with a solid surface of the mine opening as previously explained. Suitable preamplifiers 4a to 4m are provided at the sensor location to amplify the signals received by the transducers. Signal conditioners 6a to 6m may also be provided at the same location to facilitate data transmission. Data transmitters 8a to 8m transfer the signal to signal processor 10. The signal processing includes signal rectification, if not done at the transducer location, to recognize the occurrence of microseismic events and the time duration of the events. Recognition of the seismic events as recorded by each of transducers T1 to TM is accomplished in corresponding events recognition circuits 12a to 12m. The recognition of an event is based on the occurrence of a signal from the sensor which exceeds a threshold level which may be either fixed or variable. Events timing circuits 14a to 14m provide estimates of the energy in the signals. The energy estimate for a signal is directly proportional to the length of time which the rectified signal exceeds the threshold. This processing is done for each transducer individually.

Data processor 16 contains events counter circuits 18a to 18m which count the number of events which occur during a predetermined time interval which may be of the order of 1 minute. Also included are energy counter circuits 20a to 20m which receive the outputs of the events timing circuits of the signal processor 10 and accumulate the energy estimate during the same interval as in the case of the events counters. It has been found that neither of the counts of events or energy is sufficient to provide accurate warning of impending ground failure. However, it has been found that by calculating the ratio of energy/event count that a very distinct anomaly occurs prior to groundfalls. Calculators 22a to 22m receive the outputs of the events counters and energy counters as shown in FIG. 2 and calculate the energy/event ratios. Whenever the energy/event ratio exceeds a predetermined value a warning is provided. The warning level may be fixed or adjustable and is determined by warning level control 24 which, when adjustable, is set by external input device 25. Scanner 26 scans the information on energy/event ratio as determined by calculators 22a to 22m and provides output signals via data transmission circuits 11a to 11m if a warning level is met to turn on warning devices W1 to WM. Warning devices W1 to WM, as previously noted, are located at or near the location originating the sufficiently high energy/event ratio.

The data processor will also signal a warning if other predetermined conditions are met, such as the following:

(a) an energy/event ratio which exceeds some other value less than that noted above for sufficiently long periods of time;
(b) an indicated change of event count pattern.

The warning output from data processor 16 is a signal which turns on one or more warning devices, which may be audio and/or visual, in the vicinity of the respective sensors. Different levels of warning such as cautionary or alarm may be given. The data processor also provides the following outputs:

(a) output to a printer, plotter and/or recording device 34 to record for each sensor at each time interval, the number of events, energy and energy/event ratio and warning condition if present;
(b) output of all the above to the central data processing unit via data transmission 35.

Figure 3:
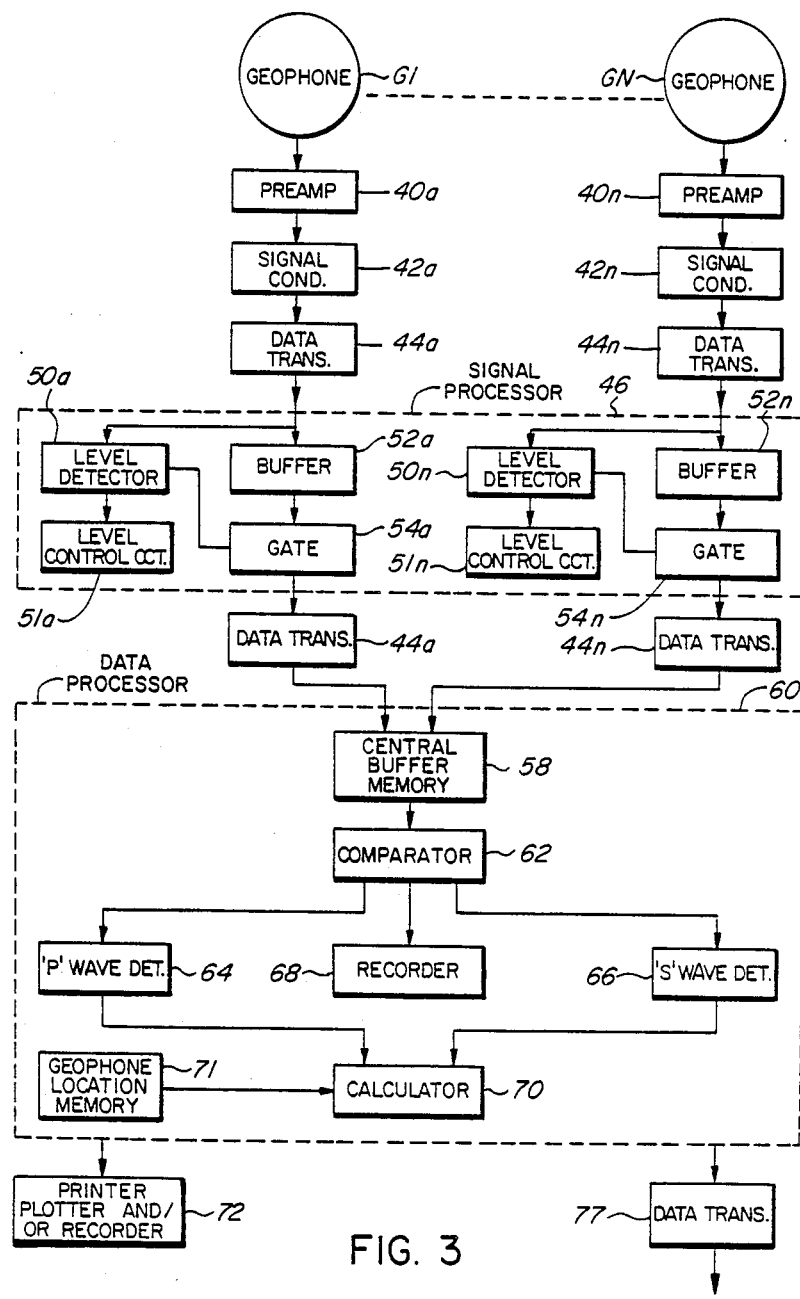
FIG. 3 is a block diagram of the low frequency subsystem.

Details of the low frequency or source location subsystem are shown in FIG. 3. The sensors for this subsystem consist of a plurality of geophones G1 to GN or equivalent devices capable of responding to ground acceleration or velocities, including appropriate preamplifiers 40a to 40n. These sensors normally operate at, but are not limited to, frequencies below 1 Kilohertz. At the sensor location there may also be included any additional signal processing which is required to facilitate data transmission and which is shown in FIG. 3 by signal conditioners 42a to 42n. Data transmitters 44a to 44n from the sensors may be any suitable means such as electrical, optical or radio wave as in the case of the high frequency subsystem. Signal processor 46 provides signal processing which may be for individual sensors or for a particular sub-group of sensors. Level detectors 50a to 50n recognize if any particular signal exceeds either the fixed or variable level. Suitable buffers 52a to 52n are included which provide that when an event is recognized a prior record of the seismic signal of a time duration in seconds or tens of seconds is available. The occurrence of such an event is applied to one of gates 54a to 54n causing the information on the actual time of occurrence of the event together with the prior history of a record of predetermined duration to be fed to data processor 60 via the corresponding one of gates 54a to 54n and the corresponding one of data transmitters 44a to 44n. The source location data processor will normally complete the determination of the event. The information from the data transmitters 44a to 44n is passed to central buffer memory 58 the output of which is applied to comparator 62. Comparison is made of all geophones within the array to determine if a sufficient number of sensors have recorded a signal within a specified time period to qualify as a seismic event. If an event has occurred, the onset of the seismic P (longitudinal) wave at each sensor is determined by P wave detector 64. Also included may be the recognition of the onset time of the seismic S (transverse) wave at each geophone by S wave detector 66 if the source location logic using the (S-P) technique is to be used. Also, if an event has occurred, a record of it is made in recorder 68 with details of the event. If an event has occurred, through further processing logic calculator 70, the source location of the seismic event and the magnitude of it are determined. Information about geophone location for purposes of calculation is provided from geophone location memory 71.

Outputs from the data processor 60 include:
(a) output to a printer, tape recorder, or other suitable recording device 72 to record for each sensor the onset time of events and the complete seismogram received at that sensor;
(b) output to the central data processor via data transmitter 77 giving the arrival time at each sensor, the calculated source location of the event and the magnitude.

Figure 4:
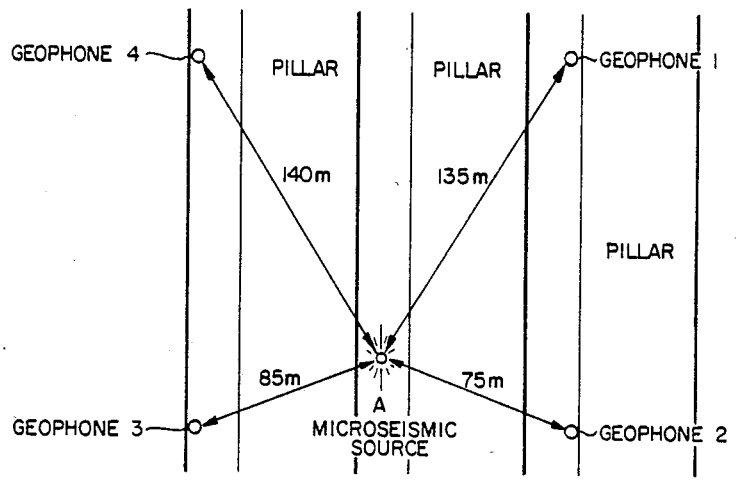
FIG. 4 illustrates a typical geophone arrangement for the low frequency system.
Figure 5:
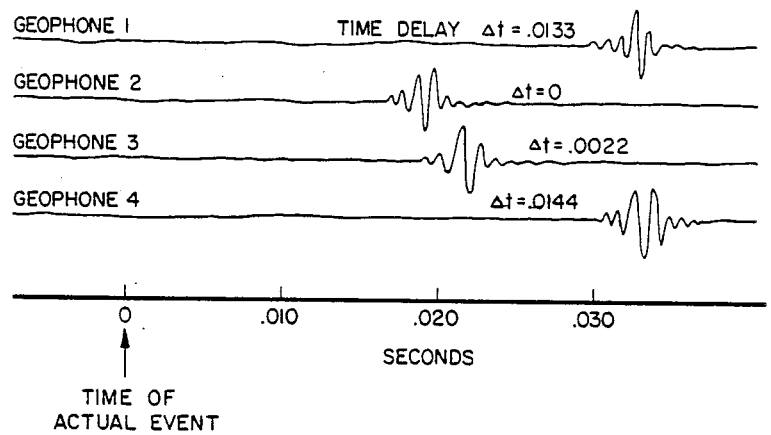
FIG. 5 shows typical seismic records for the low frequency system.

The method of determination of a seismic event using the low frequency location subsystem is illustrated in FIGS. 4 and 5. The technique is based on arithmetic triangulation to calculate the location of the source from arrival times of microseismic signals at four or more adjacent geophones or similar sensors.

The principle involved can best be explained with reference to the following hypothetical examples. FIG. 4 shows a plan view of a room and pillar mining layout with four geophones located with 150 meter spacing. If a microseismic event occurs at the back of the room at location A assuming seismic velocity of 4,500 meters per second, in the range of value of sylvite, then the seismic record at the four geophones would appear as shown in FIG. 5. Note that at the moment that the actual microseismic event occurs there is no trace on the geophone record. This is due to the fact that the seismic wave does not propagate instantaneously but rather at a velocity dependent on the characteristics of the rock material, in this case 4,500 meters per second.

It is common in this technique to assign an "arrival time" of 0 to the first geophone to record the event and by subtraction to get the "delay" in arrival times at the others. It is obvious that under normal circumstances, the first geophone to record the event is closest to the actual source. Given the wave velocity, the differences in travel time allow us to set up polynomial equations in x, y and z coordinates of geophones and the event location, which will have a unique interpretation being the source location. State of the art treatment of the technique has developed to the extent that it is only necessary to key into the computer x, y and z coordinates of the geophones, and have the geophone inputs provided directly to the computer controller system in order to get a printout of the event location.

Figure 6:
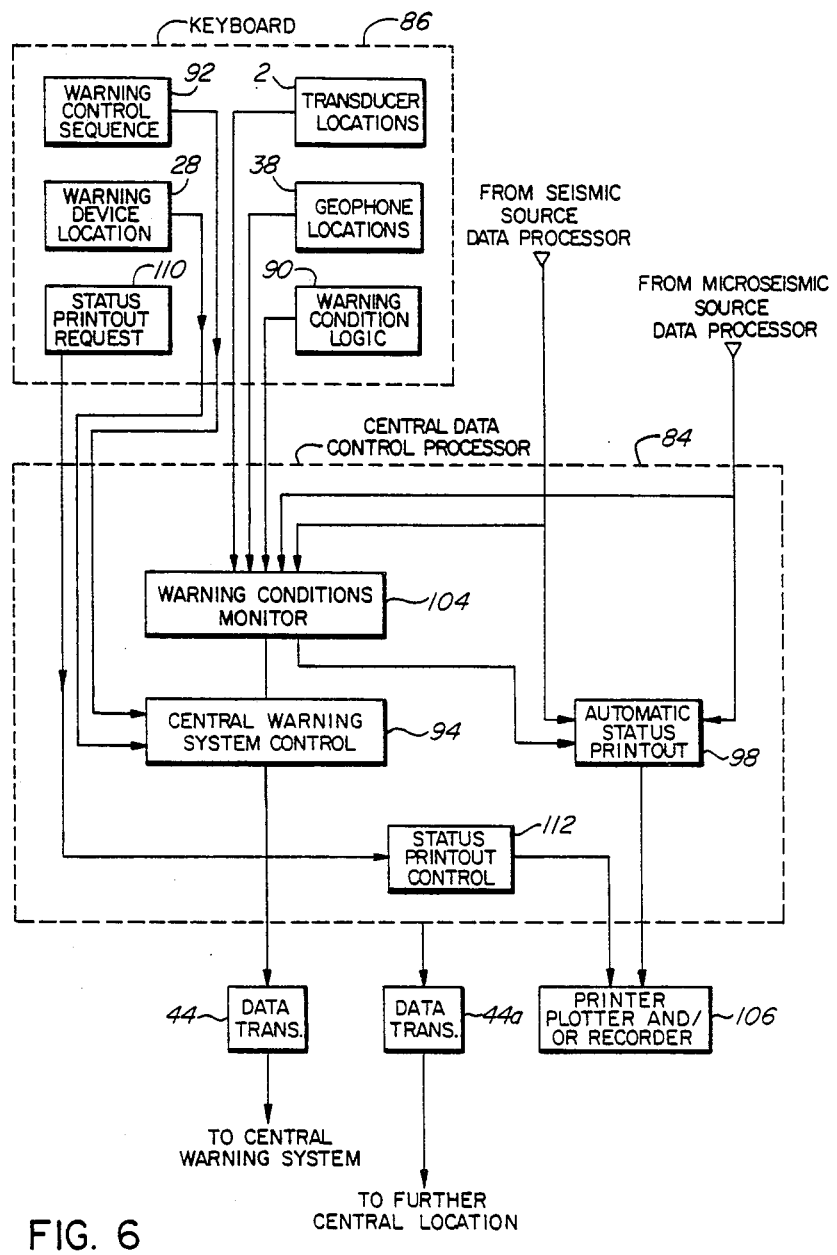
FIG. 6 is a block diagram of the central data processing and system control.

The central data processor and system control is shown in FIG. 6. It obtains data after suitable transmission from: the microseismic data processor 16, which provides data pertaining to the energy/event ratio and any warning conditions; the seismic source location processor 60 which provides data pertaining to the source location and magnitude of any seismic event; and inputs from the keyboard or equivalent device 86. The keyboard provides information on the location of each geophone, the location of each high frequency transducer, the location of each warning device 88 and 28, information to control warning condition logic 90 to determine warning conditions, information to warning control sequence 92 of the central warning system 94 when the predetermined logical conditons are met.

As shown in FIG. 6 outputs from transducer locations 2, geophone locations 38 and warning control logic 90 on the keyboard and from the seismic source data processors are connected to warning conditions monitor 104. The outputs from warning control sequence 92 and warning device locations 28 on the keyboard are connected to central control warning system 94 to which an output of the warning conditions monitor is also applied. The output from central warning system control 94 is applied via data transmission 44 to the central warning system. The output of status printout request 110 on the keyboard is connected to status printout control 112 the output of which is applied to printer, plotter and/or recorder 106. Automatic status printout 98 derives inputs from warning conditions monitor 104 and from the seismic source data processors and the output of automatic status printout is also applied to printer, plotter and/or recorder 106.

From the various inputs above and the internal logic control the central data processor 84 will provide the following:

(a) automatic control of the central warning system 94 when the predetermined logical conditions are met;

(b) automatic status output from automatic status printout 98 whenever one of the following occur;
  (i) a warning has occurred in the high frequency or microseismic system;
  (ii) a seismic event has been recorded by the seismic source location subsystem;
  (iii) a warning has occurred as determined by the central data processor 84;

(c) status reports of all seismic events by location and magnitude together with any warning conditions, which have occurred over a period of time in the order of one month or on demand from the keyboard 86. This status output may include maps as well as printed location explanation;

(d) output of status may be sent to a further central location where several systems are employed within one mine or where information from a plurality of mines is to be collated at a central location.

Figure 7:
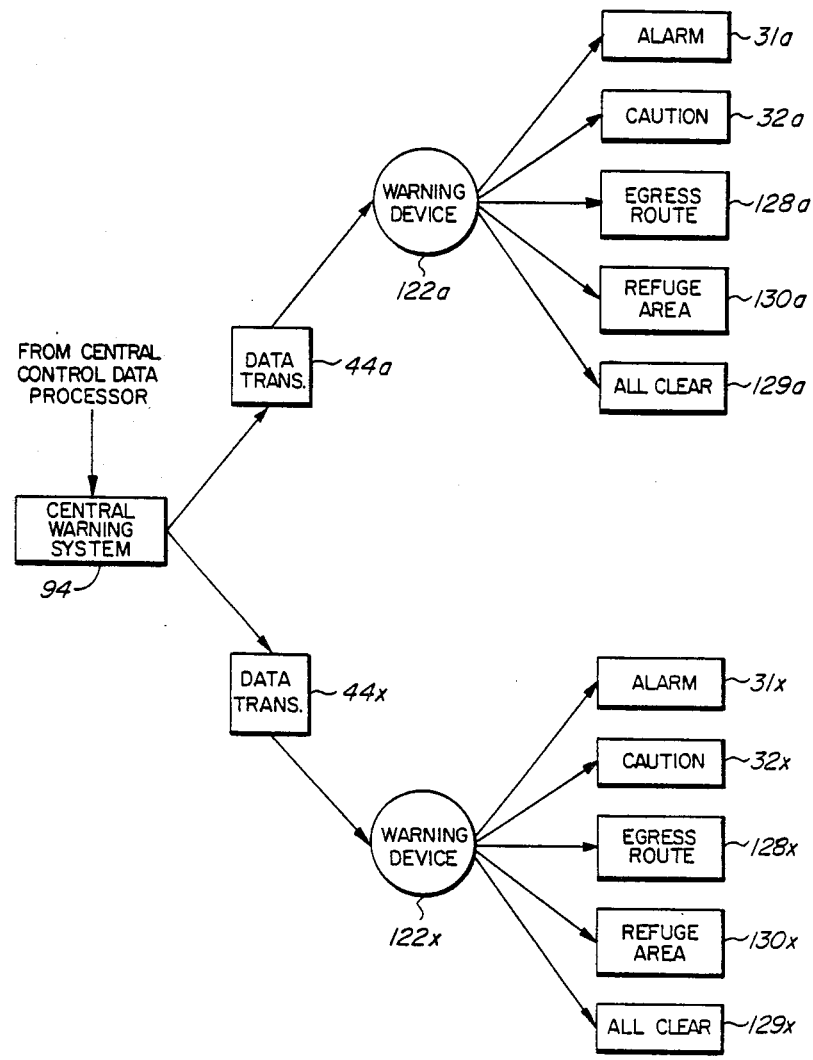
FIG. 7 shows details of the central warning system.

FIG. 7 shows details of the central warning subsystem. This system receives its control from the central data processor 84. The central warning system 94 consists of a plurality of warning devices, which may be audio and/or visual, located in appropriate parts of the mine workings such that warning conditions can be signaled where they will be readily apparent to the mine workers. As shown in FIG. 7 information from the central warning system is transferred via data transmitters 44a to 44x to various warning devices 122a to 122x of which two are shown in FIG. 7. These warning devices provide information as shown in FIG. 7 on alarm, caution, egress route, refuge area, and all clear.

Although the present invention has been described with reference to a preferred embodiment thereof, many modifications and alterations may be made within the spirit of the present invention. Those skilled in the art will recognize such modifications to the apparatus and method. Accordingly, the foregoing embodiment is to be considered as illustrative only, rather than restrictive of the invention, and any such modifications as come within the meaning and range of equivalency of the claims are to be included.

I claim:

1. An intergrated acoustic network system for providing a warning of impending groundfall in a mine comprising:

an array of high frequency microseismic sensor means situated at space locations in said mine to receive high frequency microseismic signals related to movement in ground formations adjacent said mine;

an array of at least four low frequency seismic sensor means situated at spaced locations in said mine to receive low frequency seismic signals related to stress build up in ground formations adjacent said mine;

data processing means;

means for transmitting said high and low frequency signals from said arrays to said data processing means;

said high frequency sensor means being utilized for time prediction and said low frequency sensor means being utilized for location prediction;

said data processing means processing signals from said high and low frequency arrays to calculate a ratio of energy/event count to provide a distinct anomaly prior to groundfalls and thereby recognize and determine the location of an impending ground failure; and a warning system connected to said data processing means to receive signals of an impending ground failure therefrom.

2. An integrated acoustic network system as claimed in claim 1 wherein said data processing means comprises a seismic source location processor, a microseismic data processor and a central data processor; said seismic source data processor receiving signals from said low frequency array and determining the source location and amplitude of said signals, said microseismic data processor receiving signals from said high frequency array and determining the energy/event ratio thereof, said central data processor receiving the data determined by said seismic source processor and said microseismic data processor.

3. An integrated acoustic network as claimed in claim 2 further comprising a keyboard to input data to said central data processor and a printer to record data output from said central data processor.

4. An integrated acoustic network system as claimed in claim 1 wherein each of said high frequency sensor means comprises a pressure sensitive transducer which responds to acoustic signals in the frequency range of 10 to 200 Kilohertz.

5. An integrated acoustic network as claimed in claim 1 wherein each of said high frequency sensor means comprises a piezoelectric transducer of lithium sulphate.

6. An integrated acoustic network as claimed in claim 1 wherein each of said low frequency sensor means comprises a geophone which responds to acoustic signals at frequencies below 1000 Hertz.

7. An integrated acoustic network as claimed in claim 1 further comprising a preamplifier which amplifies the received signals located proximate to each of said high and low frequency seismic sensor means and a signal conditioning means to facilitate data transmission located between each preamplifier and the associated means for transmitting.

8. An integrated acoustic network as claimed in claim 2 further comprising high frequency signal processing means, said high frequency seismic signals being applied to said signal processing means and the output of said signal processing means being applied to said microseismic data processor, said signal processing means recognizing seismic events based on signals the amplitude of which exceed a predetermined level and estimating the energy of said events based on the time the signal exceeds said predetermined level.

9. An integrated acoustic network as claimed in claim 8 wherein said microseismic data processor counts the number of seismic events which occur during a predetermined time interval, accumulates the accumulated energy estimate during said time interval and calculates the energy/event ratio by dividing the accumulated energy estimate by the number of events during the predetermined time interval.

10. An integrated acoustic network as claimed in claim 9 wherein said warning system includes at least one warning device associated with said microseismic data processor, located in the vicinity of one or more of said high frequency sensor means and actuated when said energy/event ratio exceeds a predetermined level.

11. An integrated acoustic network as claimed in claim 2 further comprising low frequency signal processing means, said low frequency signals outputted from said array of low frequency seismic sensor means being applied to said low frequency signal processing means and the output of said low frequency signal processing means being applied to said seismic source location processor, said low frequency signal processing means receiving and recognizing seismic signals from individual sensor means exceeding a predetermined amplitude level and transferring a time record of the occurrence of said seismic signals to said seismic source data processor, said seismic data processor determining from said time record when a seismic event has occurred and the location of the source of the event.

12. An integrated acoustic network as claimed in claim 3 wherein said warning system includes a central warning subsystem comprising a plurality of warning devices located at appropriate positions within the mine, said warning devices being actuated by said central data processor.

13. An integrated acoustic network system for providing a warning of impending ground fall in a mine, comprising:
  a first array of high frequency microseismic sensor means situated at spaced locations in said mine capable of receiving high frequency microseismic signals of greater than 10 khz related to movement in ground formations adjacent said mine, said high frequency sensor means being utilized for time prediction;
  a second array of at least four low frequency seismic sensor means situated at spaced locations in said mine capable of receiving low frequency seismic signals of less than 1 khz related to stress buildup in ground formations adjacent said mine, said low frequency sensor means being utilized for location prediction;
  data processing means for processing signals received from said first and second arrays to calculate a ratio of energy/event count to provide a distinct anomaly prior to groundfalls and thereby recognize and determine the location of an impending ground failure;
  means for transmitting high and low frequency signals from said first and second arrays to said data processing means; and
  a warning system connected to said data processing means for receiving signals of an impending ground failure therefrom.

14. A method of providing warning of conditions indicative of impending groundfall in an underground mine comprising:
  locating a plurality of high frequency seismic transducers at predetermined locations in said mine in contact with the rock formations of said mine opening to receive microseismic signals produced by stresses in said rock formations;
  locating a plurality of at least four low frequency geophones at predetermined locations in contact with said rock formations to receive signals produced by seismic events occurring in said rock formations;
  said high frequency seismic transducers being utilized for time prediction and said low frequency geophones being utilized for location prediction;
  installing a plurality of warning devices at appropriate locations;
  processing said signals received by said seismic transducers and said geophones to calculate a ratio of energy/event count to obtain data relating to impending groundfall and provide a distinct anomaly prior thereto; and
  utilizing said data to actuate said warning devices.

15. A method as claimed in claim 14 wherein the signals received by said transducers are processed to provide data relating to the energy/event ratio of microseismic signals in the frequency range 10 to 200 Kilohertz which are indicative of impending groundfall and the signals received by said geophones are processed to provide data relating to the location of the source of said signals.

* * * * *